United States Patent
Lamarre et al.

(10) Patent No.: US 11,421,606 B2
(45) Date of Patent: Aug. 23, 2022

(54) SYSTEM AND METHOD FOR DETECTING AND ACCOMMODATING A LOSS OF TORQUE ON A GAS TURBINE ENGINE

(71) Applicant: PRATT & WHITNEY CANADA CORP., Longueuil (CA)

(72) Inventors: Sylvain Lamarre, Boucherville (CA); Francois Casavant, Longueuil (CA); George Thompson, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 219 days.

(21) Appl. No.: 16/713,781

(22) Filed: Dec. 13, 2019

(65) Prior Publication Data
US 2021/0180524 A1 Jun. 17, 2021

(51) Int. Cl.
*F02C 9/28* (2006.01)
*F01D 21/00* (2006.01)

(52) U.S. Cl.
CPC .............. *F02C 9/28* (2013.01); *F01D 21/003* (2013.01); *F02D 2250/18* (2013.01); *F05B 2270/304* (2013.01); *F05D 2220/323* (2013.01); *F05D 2270/052* (2013.01); *F05D 2270/304* (2013.01); *F05D 2270/335* (2013.01)

(58) Field of Classification Search
CPC .. F02C 9/28; F02C 9/46; F01D 21/003; F02D 2250/18; F05D 2270/05; F05D 2270/051; F05D 2270/052; F05D 2270/053; F05D 2270/094; F05D 2270/095; F05D 2270/304; F05D 2270/335; F05D 2270/44; F05D 2220/323; F05D 2220/324; F05B 2270/304
See application file for complete search history.

(56) References Cited

U.S. PATENT DOCUMENTS

| | | | |
|---|---|---|---|
| 5,303,142 A | 4/1994 | Parsons et al. | |
| 5,551,227 A * | 9/1996 | Moulton | F02C 7/262 60/39.091 |
| 5,775,090 A | 7/1998 | Skarvan | |
| 2018/0097463 A1 * | 4/2018 | Unnikrishnan | H02K 7/1823 |
| 2018/0320598 A1 | 11/2018 | Lamarre et al. | |

* cited by examiner

Primary Examiner — Loren C Edwards
(74) Attorney, Agent, or Firm — Norton Rose Fulbright Canada LLP

(57) ABSTRACT

Methods and systems for operating a gas turbine engine are described. The method comprises obtaining, at a control system associated with the gas turbine engine, a measured engine core speed and an actual power demand for the gas turbine engine during operation thereof, determining an expected engine core speed based on the actual power demand from a predicted relationship between engine core speed and engine output power, comparing the measured engine core speed to the expected engine core speed, detecting a torque-related fault when the measured engine core speed differs from the expected engine core speed by more than a threshold; and accommodating the torque-related fault when detected.

16 Claims, 6 Drawing Sheets

SYSTEM AND METHOD FOR DETECTING AND ACCOMMODATING A LOSS OF TORQUE ON A GAS TURBINE ENGINE

TECHNICAL FIELD

The present disclosure relates generally to gas turbine engines, and more particularly to detecting and accommodating the loss of a torque signal on gas turbine engines.

BACKGROUND OF THE ART

Turboshaft and turboprop engines for aircraft use a torque signal for governing either on torque or on power. In the unlikely event that the torque signal is lost, it is desirable for engine control systems to be designed so that engine control is maintained. As such, there is a need for improvement.

SUMMARY

In accordance with a broad aspect, there is provided a method for operating a gas turbine engine. The method comprises obtaining, at a control system associated with the gas turbine engine, a measured engine core speed and an actual power demand for the gas turbine engine during operation thereof, determining an expected engine core speed based on the actual power demand from a predicted relationship between engine core speed and engine output power, comparing the measured engine core speed to the expected engine core speed, detecting a torque-related fault when the measured engine core speed differs from the expected engine core speed by more than a threshold; and accommodating the torque-related fault when detected.

In accordance with another broad aspect, there is provided system for operating a gas turbine engine, the system comprising a processing unit and a non-transitory computer-readable medium having stored thereon program instructions. The program instructions are executable by the processing unit for obtaining, at a control system associated with the gas turbine engine, a measured engine core speed and an actual power demand for the gas turbine engine during operation thereof, determining an expected engine core speed based on the actual power demand from a predicted relationship between engine core speed and engine output power, comparing the measured engine core speed to the expected engine core speed, detecting a torque-related fault when the measured engine core speed differs from the expected engine core speed by more than a threshold; and accommodating the torque-related fault when detected.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

There are described herein methods and systems for detecting and accommodating a torque signal failure or drift on turbine engines. A torque signal is used by a control system to govern a gas turbine engine. In the unlikely event where the torque signal is lost or erroneous, the control system is configured to detect the fault and accommodate the fault. In some embodiments, accommodating the fault comprises changing the mechanism by which the engine is governed. In particular, the control system is configured to switch from a power-governing mode to a speed-governing mode, whereby instead of modulating fuel flow to the gas turbine engine on the basis of a power demand and an actual power output from the engine (i.e. power-governing mode), the fuel flow is modulated on the basis of an expected engine core speed for the power demand (i.e. speed-governing mode).

Figure 1:
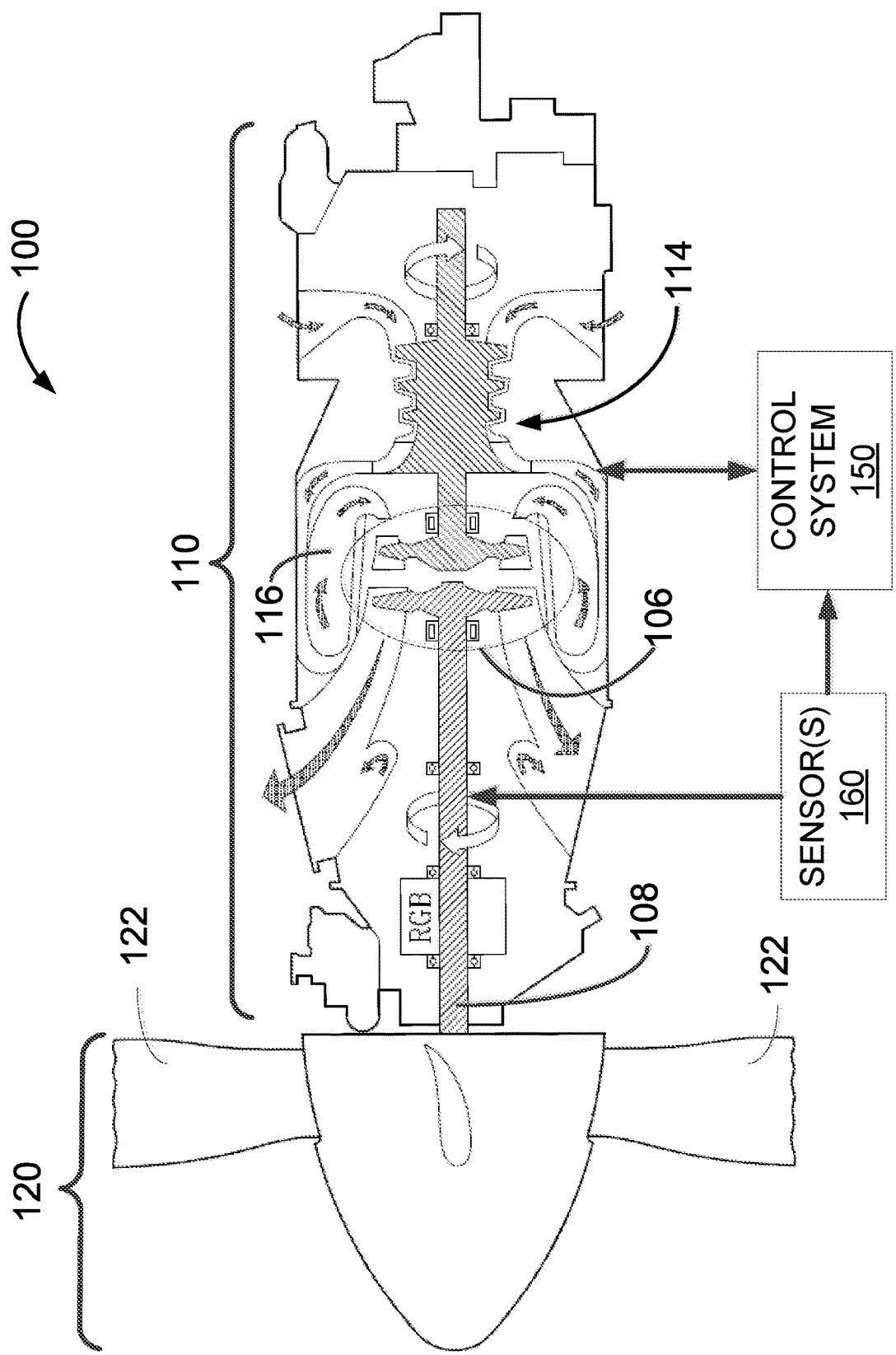
FIG. 1 is a schematic cross-sectional view of an example gas turbine engine.

FIG. 1 illustrates a powerplant 100 for an aircraft of a type provided for use in subsonic flight, generally comprising an engine 110 and a propeller 120. The powerplant 100 generally comprises in serial flow communication the propeller 120 attached to a shaft 108 and through which ambient air is propelled, a compressor section 114 for pressurizing the air, a combustor 116 in which the compressed air is mixed with fuel and ignited for generating an annular stream of hot combustion gases, and a turbine section 106 for extracting energy from the combustion gases. The propeller 120 converts rotary motion from the shaft 108 of the engine 110 to provide propulsive force for the aircraft, also known as thrust. The propeller 120 comprises two or more propeller blades 122. A blade angle of the propeller blades 122 may be adjusted. The blade angle may be referred to as a beta angle, an angle of attack or a blade pitch. The powerplant 100 may be implemented to comprise a single or multi-spool gas turbine engine, where the turbine section 106 is connected to the propeller 120 through a reduction gearbox (RGB).

Although illustrated as a turboprop engine, the powerplant 100 may alternatively be another type of engine, for example a turboshaft engine, also generally comprising in serial flow communication a compressor section, a combustor, and a turbine section, and a fan through which ambient air is propelled. In addition, although the powerplant 100 is described herein for flight applications, it should be understood that other uses, such as industrial or the like, may apply.

Control of the operation of the engine 110 can be effected by one or more control systems, for example control system 150. The control system 150 may be an engine controller, such as a Full Authority Digital Engine Control (FADEC), an Engine Electronic Control (EEC), an Engine Control Unit (ECU) or the like. In some embodiments, the control system 150 may be a combined engine and propeller controller, such as an Engine & Propeller Electronic Control (EPEC). The control system 150 can modulate a fuel flow rate provided to the engine 110, the position and/or orientation of variable geometry mechanisms within the engine 110, a bleed level of the engine 110, and the like.

The control system 150 modulates fuel flow to the engine 110 in order to obtain a desired output power. In regular operation, fuel flow may be managed in a closed-loop, such that a given output parameter of the engine 110 is measured and fuel flow is increased or decreased as a function of the measured parameter in order to increase or decrease, respectively, the output power of the engine 110. For example, when governing on torque or power in a closed-loop, the torque or power of the engine 110 is determined using one or more sensor(s) 160. Power may be determined by multiplying torque by propeller speed (Q×Np). The sensor(s) 160 may comprise torque sensors to measure torque directly from the shaft 108 of the engine 110. The sensor(s) 160 may comprise speed sensors or accelerometers to measure speed/acceleration from the shaft 108 and torque may be calculated from the measurements. Other embodiments for obtaining the torque of the engine 110 may also be used.

Figure 2:
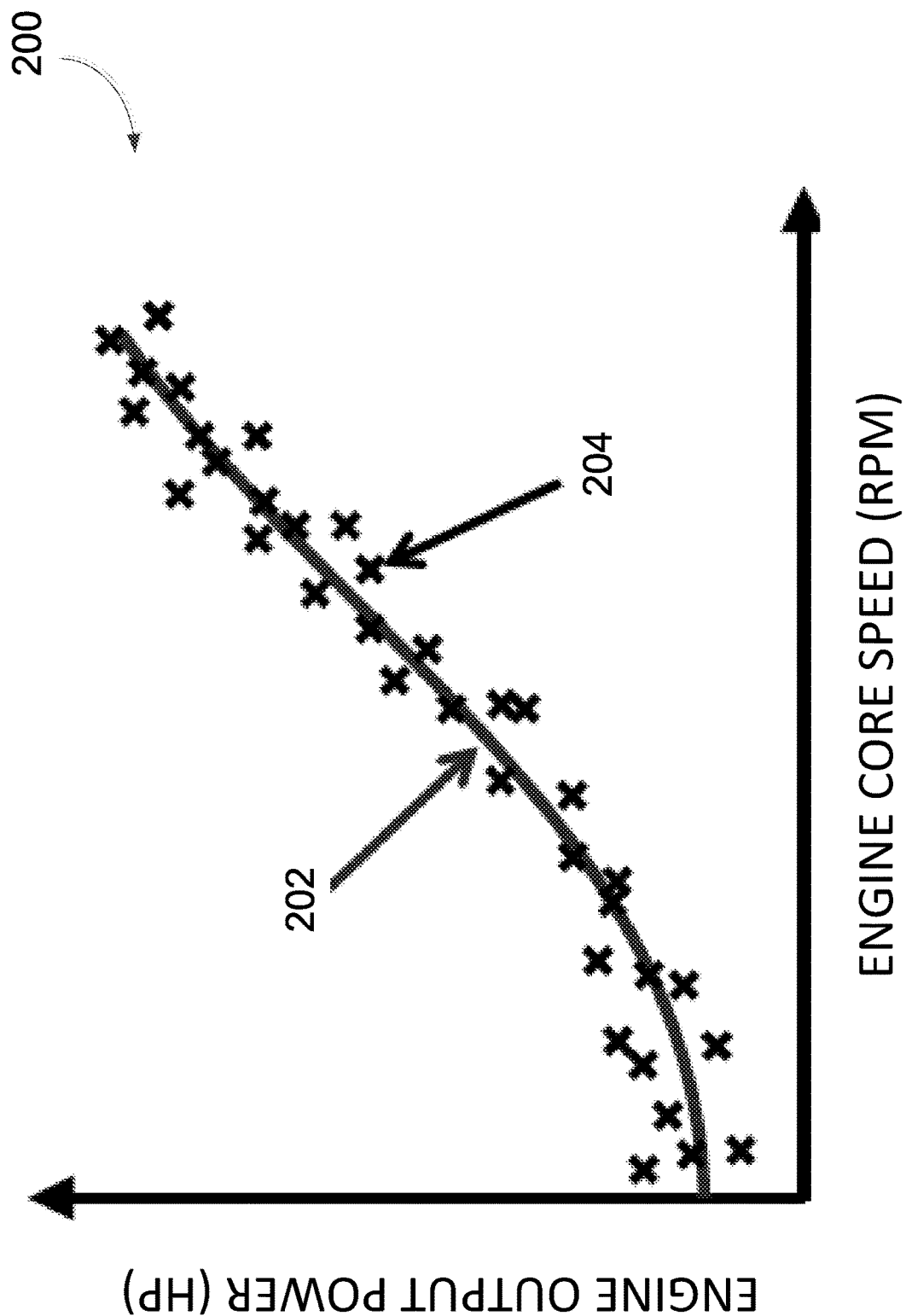
FIG. 2 is a graph of an example predicted relationship between engine output power and engine core speed.

In certain instances, the torque signal obtained from the sensor(s) 160 may be lost or erroneous. The control system 150 is configured to detect these circumstances using one or more predicted relationships between engine core speed and engine power. An example is illustrated in the graph 200 of FIG. 2. Curve 202 is the relationship between engine core speed and engine power. In other words, engine output power is expressed as a function of the engine core speed. Engine output power and/or engine core speed may be normalized, mechanical or percentage-based. The curve 202 may be built from numerical simulation results, experimental data, or a combination thereof. In some embodiments, curve 202 is a function of one or more operating conditions of the aircraft and/or engine, such as altitude, outside air temperature (OAT), airspeed, angle of entry of the airflow into the engine intake, and others. Installation effects of the engine may also be taken into account. A plurality of curves 202 may therefore be constructed, each one corresponding to a given set of operating conditions. In other embodiments, a single curve 202 is constructed to take into account a plurality of different operating conditions, and is applicable under more than one set of operating conditions.

The data points 204 are obtained across the envelope of a gas turbine engine under one or more sets of operating conditions and averaged to produce the curve 202. In some embodiments, the data points 204 are obtained from a single gas turbine engine under the one or more operating conditions. In other embodiments, the data points are obtained from a plurality of gas turbine engines under the one or more operating conditions, and represent an average of the multiple engines.

Figure 3:
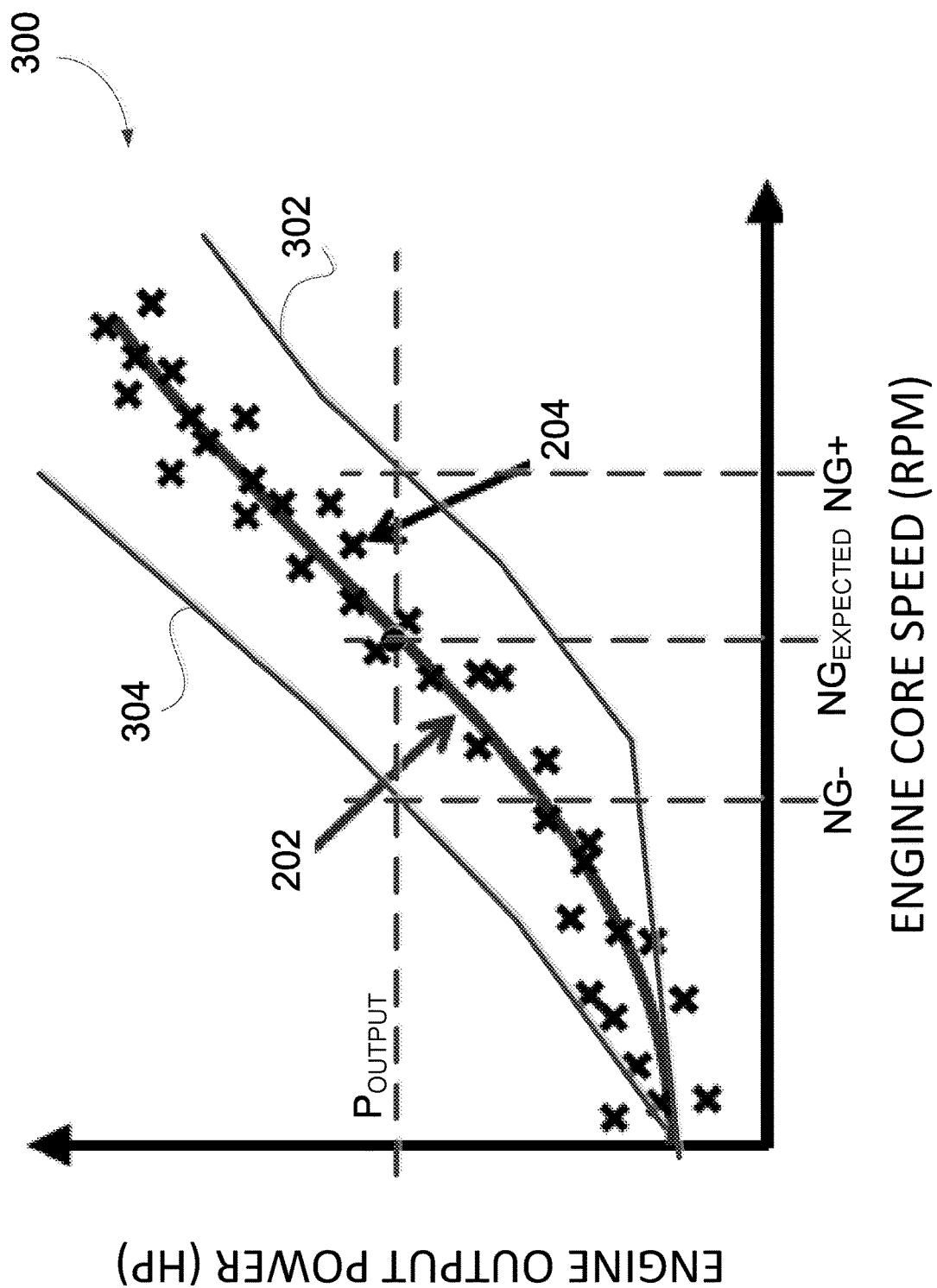
FIG. 3 is the graph of FIG. 2 with maximum and minimum limits for engine core speed overlaid thereon.

Referring to FIG. 3, graph 300 illustrates the predicted relationship curve 202, overlaid with a maximum 302 and a minimum 304 threshold for engine core speed. For a given engine output power ($P_{output}$) there is a corresponding expected engine core speed ($NG_{expected}$). Using the maximum 302 and minimum 304 thresholds, the engine output power and corresponding expected engine core speed also have a maximum engine core speed (NG+) and a minimum engine core speed (NG−) associated thereto.

The control system 150 uses the maximum 302 and minimum 304 thresholds to detect a torque-related fault. Using the actual power demand, an expected engine core speed is obtained from curve 202. The associated maximum and minimum engine core speeds are also obtained. A measured engine core speed is compared to the maximum and minimum engine core speeds. A torque-related fault is detected when the measured engine core speed is outside of the range defined by the maximum and minimum engine core speeds, i.e. greater than the maximum engine core speed or less than the minimum engine core speed. In some embodiments, the control system 150 is configured to limit the engine core speed to the maximum 302 and minimum 304 thresholds, as a safety measure. The engine core speed is prevented from going beyond the maximum threshold 302 and below the minimum threshold 304. In such circumstances, a torque-related fault is detected when the measured engine core speed is on the threshold 302 or 304 for a given duration of time.

When a torque-related fault is detected, the control system 150 is configured to accommodate the fault. In some embodiments, accommodating the fault means logging the fault for maintenance purposes. In some embodiments, accommodating the fault means communicating the fault to the pilot. For example, the fault may be annunciated in the cockpit using one or more discrete switches, ARINC, a message on a cockpit display, and other suitable alerting mechanisms visible to the pilot or an aircraft operator. If an engine core speed limiting function was previously enabled, accommodating may comprise disabling the limiting function to allow extra power for emergencies. Disabling the limiting function may be triggered automatically upon detecting the torque-related fault, or it may be triggered manually by the pilot once the torque-related fault has been annunciated in the cockpit. The control system 150 may be configured to offer disabling of the limiting function to the pilot upon detection of the torque-related fault. In some embodiments, disabling occurs upon a slam/reslam of a power lever angle (i.e. a fast movement towards either max power or idle gate). Other embodiments may also apply.

In some embodiments, accommodating the fault means governing the gas turbine engine using the expected engine core speed. This is referred to herein as operating in a speed-governing mode, as opposed to governing in a power-governing mode. When in power-governing mode, the control system 150 compares an actual power output to an actual power demand and increases or decreases fuel flow accordingly. When in speed-governing mode, the control system 150 sets fuel flow to obtain a desired or target engine core speed. The desired or target engine core speed used is the expected engine core speed that corresponds to the actual power demand. For example, when in speed-governing mode, a position of a power lever may be used to determine the actual power demand. Curve 202 may be used to obtain the expected engine core speed that corresponds to the actual power demand, and fuel flow may be set as a function of the expected engine core speed. Switching from the power-governing mode to the speed-governing mode may be triggered automatically upon detection of the torque-related fault, or it may be triggered manually by the pilot once the torque-related fault has been annunciated in the cockpit. The control system 150 may be configured to offer speed-governing mode to the pilot upon detection of the torque-related fault.

The maximum 302 and minimum 304 thresholds may be determined using the same set of conditions as the predicted relationship curve 202. For example, if the predicted relationship curve 202 corresponds to a given set of operating conditions, the maximum 302 and minimum 304 thresholds may also correspond to the same set of operating conditions. As such, the maximum 302 and minimum 304 thresholds may take into account one or more set of operating conditions, and may represent one or more gas turbine engine, characterized across an operating envelope of the engine(s).

Figure 4:
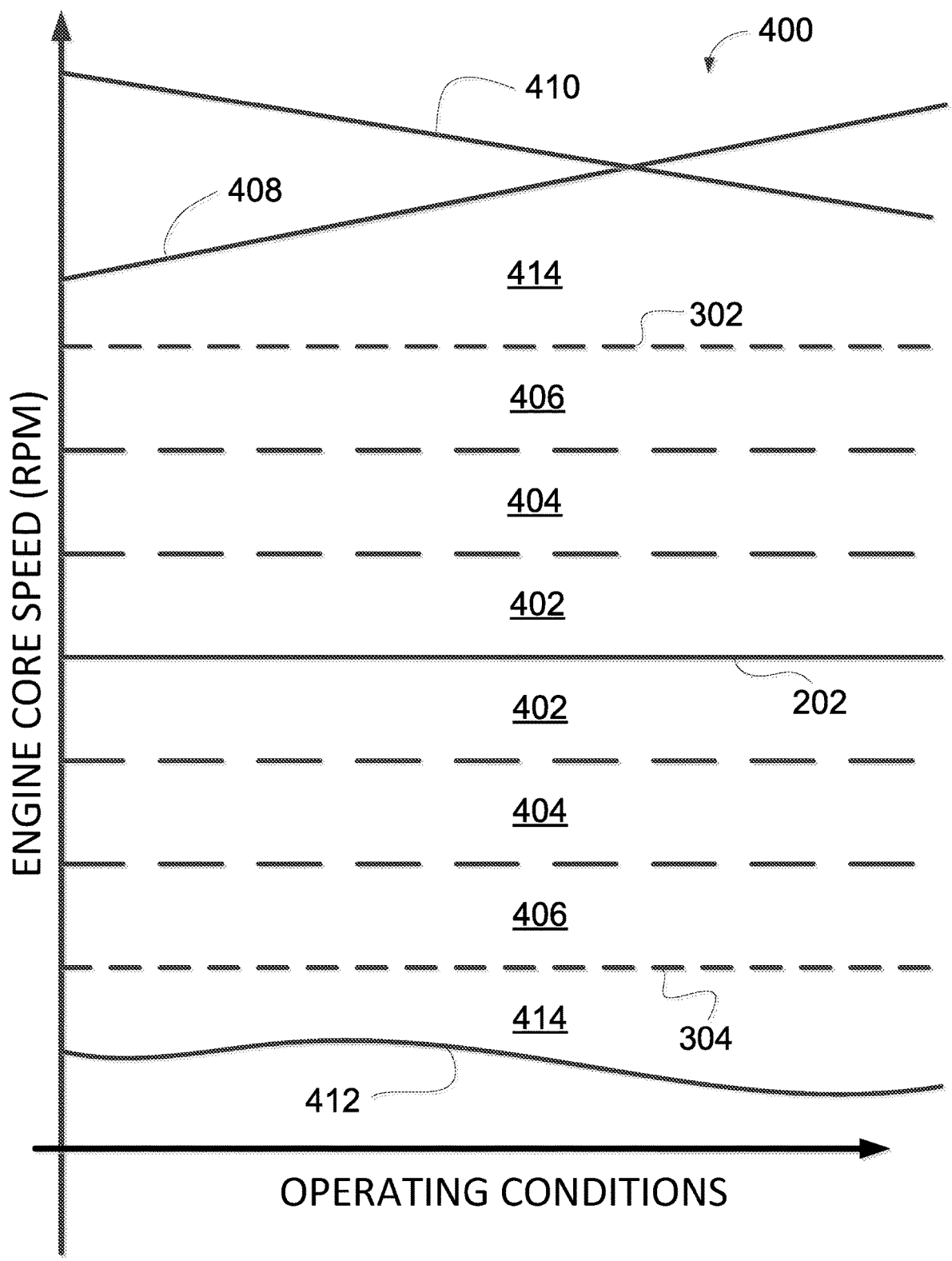
FIG. 4 is a graph showing example design requirements for the maximum and minimum limits for engine core speed.

The maximum 302 and minimum 304 thresholds may be designed to ensure maximum rated power throughout the operating envelope of the engine by taking into account certain uncertainties with the predicted relationship curve 202. An example is shown in the graph 400 of FIG. 4. The anticipation curve 202 is separated from the thresholds 302, 304 by one or more region 402, 404, 406 that each account for a given type of uncertainty associated with the predicted relationship curve 202. For example, region 402 may account for a modeling inaccuracy, related to the model used to generate the predicted relationship curve 202. Region 404 may account for engine deterioration, which can vary from one engine to another and which may have an impact on the engine core speed. Region 406 may account for transitory operation of the engine, i.e. when the engine is in a transient state instead of a steady state, to allow for engine core speed transient overshoot following slam accelerations and/or engine core speed transient undershoot following slam decelerations, for example.

Also provided on the graph 400 are curves that define a torque transitory limit 408, a thermal limit 410, and a loss of power or thrust control limit 412. These limits 408, 410, 412 may be taken into account when setting the maximum 302 and minimum 304 thresholds, so as to provide some design margin 414 when all uncertainties are taken into account. The maximum 302 threshold is thus set low enough to mitigate engine mechanical or thermal exceedances. The minimum 304 threshold is set sufficiently high to not interfere with the integrity or safety of the flight. The maximum 302 and minimum 304 thresholds may be built from numerical simulation results, experimental data, or a combination thereof.

Figure 5:
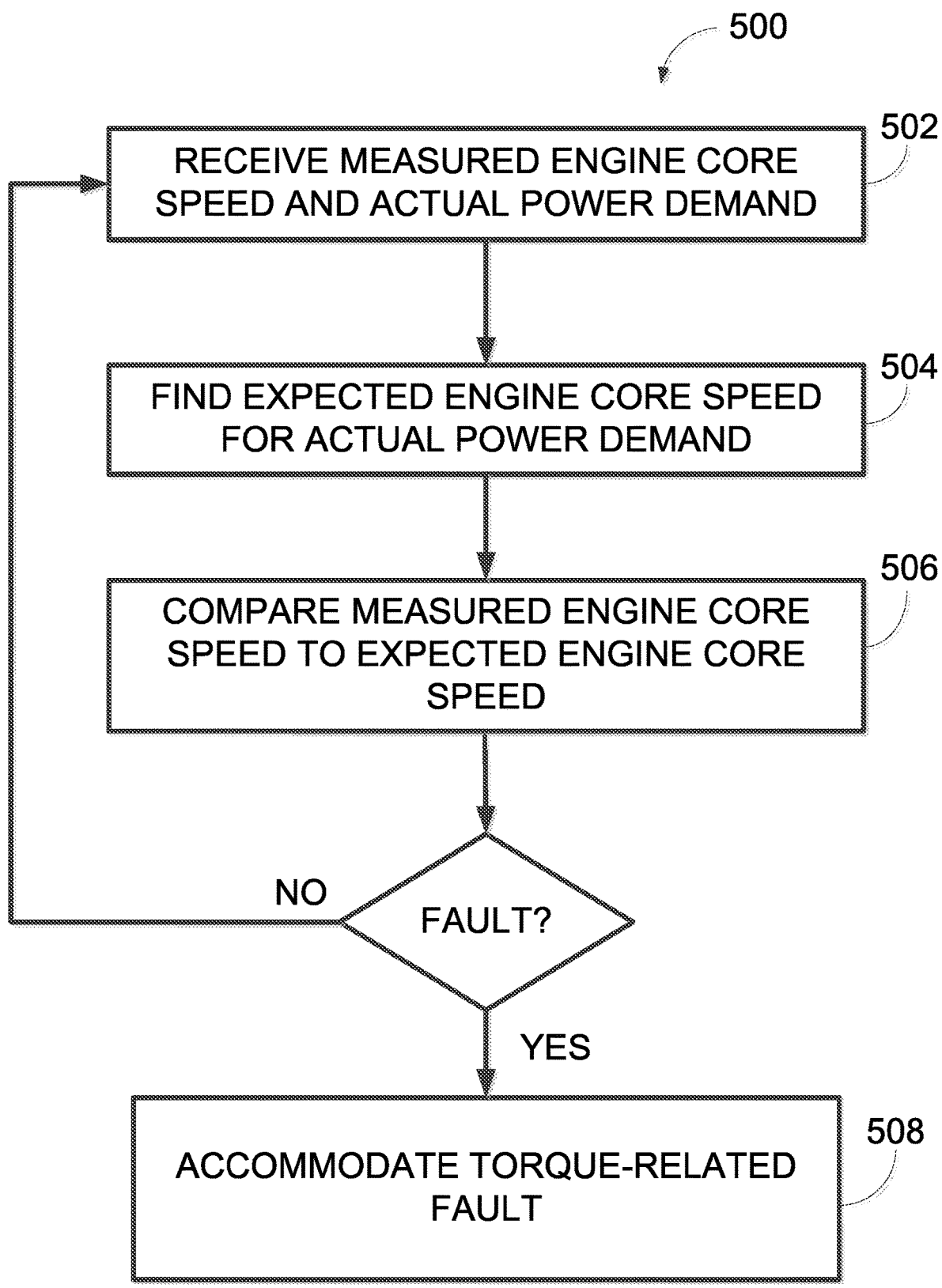
FIG. 5 is a flowchart of an example method for operating a gas turbine engine.

Referring to FIG. 5, there is illustrate a method 500 for operating a gas turbine engine. At step 502, engine parameters such as the measured engine core speed and the actual power demand of the engine are received. At step 504, the expected engine core speed is determined from a predicted relationship between engine output power and engine core speed. The actual power demand is used as an input to the predicted relationship and the expected engine core speed is output therefrom.

At step 506, the measured engine core speed is compared to the expected engine core speed. If the measured engine core speed differs from the expected engine core speed by more than a threshold, a torque-related fault is detected. The threshold is defined by a range set out by maximum and minimum limits for the engine core speed. At step 508, the torque-related fault is accommodated when detected.

The range set out by the maximum and minimum limits for the engine core speed allows the use of rated power throughout the life of the engine without having to monitor and store any steady state deterioration value, since deterioration is already taken into account in the determination of the threshold. The limits also protect from high and low torque signal drifts and allows the identification of torque system issues, such as permanent torque drift in both directions, temporary loss of torque during a time when the aircraft or engine conditions are changing, and engine malfunctions or failures resulting in a diverging gas generator speed at a given power reference.

The method 500 may also be applicable to an engine architecture having more than two rotors. For example, a three spools engine configuration, the two rotors not mechanically connected to the propeller could have their own predicted relationship and their own maximum and minimum engine core speed limits. For a two spool engine, the engine core speed refers to the speed of the gas generator. For a three spool engine, there may be an engine core speed for a high pressure spool and another engine core speed for a low pressure spool.

In some embodiments, the predicted relationship and the maximum and minimum limits to engine core speed may be combined in a unique authorized NGN speed range that varies with the power demand, the operating condition (airspeed, OAT, altitude) and the modeling inaccuracy, transient operation, engine deterioration, installation losses.

Figure 6:
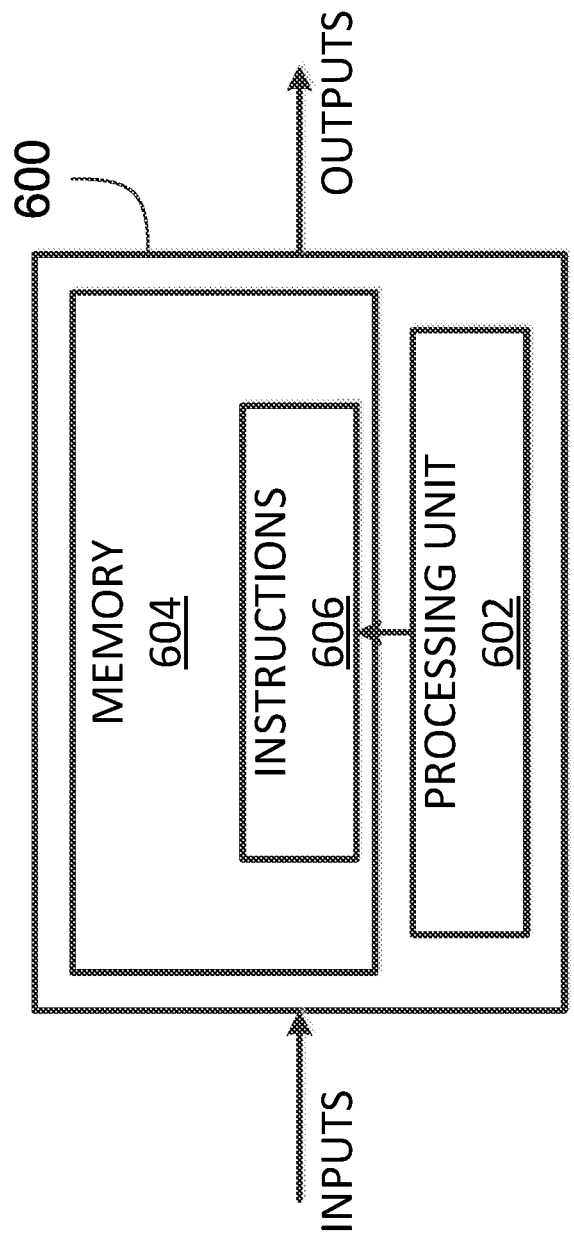
FIG. 6 is a block diagram of an example computing device.

With reference to FIG. 6, the method 500 may be implemented by a computing device 600, comprising a processing unit 602 and a memory 604 which has stored therein computer-executable instructions 606. The processing unit 602 may comprise any suitable devices configured to implement the system such that instructions 606, when executed by the computing device 600 or other programmable apparatus, may cause the functions/acts/steps of the method 500 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to a device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for detection and accommodation described herein may be implemented in a high level procedural or object oriented programming or scripting language, or a combination thereof, to communicate with or assist in the operation of a computer system, for example the computing device 600. Alternatively, the methods and systems for detection and accommodation may be implemented in assembly or machine language. The language may be a compiled or interpreted language. Program code for implementing the methods and systems for detection and accommodation may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detection and accommodation may also be considered to be implemented by way of a non-transitory computer-readable storage medium having a computer program stored thereon. The computer program may comprise computer-readable instructions which cause a computer, or in some embodiments the processing unit 602 of the computing device 600, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, various combinations of the software and/or hardware components described herein may be used. Yet further modifications could be implemented by a person of ordinary skill in the art in view of the present disclosure, which modifications would be within the scope of the present technology.

The invention claimed is:

1. A method for operating a gas turbine engine, the method being performed by a control system of the gas turbine engine, the method comprising:
   obtaining a measured engine core speed and an actual power demand for the gas turbine engine during operation thereof;
   determining an expected engine core speed based on the actual power demand from a predicted relationship between engine core speed and engine output power, the predicted relationship corresponding to a set of operating conditions;
   selecting the predicted relationship from a plurality of predicted relationships as a function of actual operating conditions;
   comparing the measured engine core speed to the expected engine core speed;
   detecting a torque-related fault when the measured engine core speed differs from the expected engine core speed by more than a threshold; and
   accommodating the torque-related fault when detected.

2. The method of claim 1, wherein accommodating the torque-related fault comprises governing the gas turbine engine using the expected engine core speed to set fuel flow.

3. The method of claim 2, further comprising governing the gas turbine engine using the actual power demand to set fuel flow when the measured engine core speed differs from the expected engine core speed by less than the threshold.

4. The method of claim 1, wherein the threshold defines a maximum limit and a minimum limit for the engine core speed.

5. The method of claim 4, further comprising a limiting of the engine core speed to the maximum limit and the minimum limit.

6. The method of claim 5, further comprising disabling the limiting of the engine core speed to the maximum limit and the minimum limit when the torque-related fault is detected.

7. The method of claim 1, wherein the predicted relationship represents an average of a plurality of engines.

8. The method of claim 1, wherein the predicted relationship accounts for one or more of a modeling inaccuracy, engine deterioration, installation losses, and transient operation of the engine.

9. A system for operating a gas turbine engine, the system comprising:
   a processing unit; and
   a non-transitory computer-readable medium having stored thereon a plurality of program instructions executable by the processing unit for:
      obtaining a measured engine core speed and an actual power demand for the gas turbine engine during operation thereof;
      determining an expected engine core speed based on the actual power demand from a predicted relationship between engine core speed and engine output power;
      comparing the measured engine core speed to the expected engine core speed;
      detecting a torque-related fault when the measured engine core speed differs from the expected engine core speed by more than a threshold; and
      accommodating the torque-related fault when detected;
   wherein:
      the predicted relationship corresponds to a set of operating conditions; and
      the program instructions are further configured for selecting the predicted relationship from a plurality of predicted relationships as a function of actual operating conditions.

10. The system of claim 9, wherein accommodating the torque-related fault comprises governing the gas turbine engine using the expected engine core speed to set fuel flow.

11. The system of claim 10, wherein the program instructions are further configured for governing the gas turbine engine using the actual power demand to set fuel flow when the measured engine core speed differs from the expected engine core speed by less than the threshold.

12. The system of claim 9, wherein the threshold defines a maximum limit and a minimum limit for the engine core speed.

13. The system of claim 12, wherein the program instructions are further configured for a limiting of the engine core speed to the maximum limit and the minimum limit.

14. The system of claim 13, wherein the program instructions are further configured for disabling the limiting of the engine core speed to the maximum limit and the minimum limit when the torque-related fault is detected.

15. The system of claim 9, wherein the predicted relationship represents an average of a plurality of engines.

16. The system of claim 9, wherein the predicted relationship accounts for one or more of a modeling inaccuracy, engine deterioration, installation losses, and transient operation of the engine.

* * * * *